United States Patent [19]
Williams

[11] Patent Number: 5,649,157
[45] Date of Patent: Jul. 15, 1997

[54] MEMORY CONTROLLER WITH PRIORITY QUEUES

[75] Inventor: James B. Williams, Lowell, Mass.

[73] Assignee: Hewlett-Packard Co., Palo Alto, Calif.

[21] Appl. No.: 413,672

[22] Filed: Mar. 30, 1995

[51] Int. Cl.⁶ .................................................. G06F 13/18
[52] U.S. Cl. ...................... 395/478; 395/462; 395/485; 395/859; 395/860
[58] Field of Search .................................... 395/468, 469, 395/470, 478, 485, 872, 874, 292, 859, 860, 250

[56] References Cited

U.S. PATENT DOCUMENTS

| | | | |
|---|---|---|---|
| 3,771,137 | 11/1973 | Barner et al. | 395/447 |
| 4,141,067 | 2/1979 | McLagam | 395/468 |
| 4,493,019 | 1/1985 | Kim et al. | 395/375 |
| 4,881,163 | 11/1989 | Thomas et al. | 395/250 |
| 4,980,852 | 12/1990 | Giroir et al. | 395/775 |
| 5,125,083 | 6/1992 | Fite et al. | 395/375 |
| 5,163,142 | 11/1992 | Mageau | 395/469 |
| 5,257,374 | 10/1993 | Hammer et al. | 395/650 |
| 5,432,918 | 7/1995 | Stamm | 395/483 |
| 5,434,993 | 7/1995 | Liencres et al. | 395/460 |

OTHER PUBLICATIONS

Jim Handy, "The Cache Memory Book", Academic Press, 1993, pp. 60-86.

Primary Examiner—Eddie P. Chan
Assistant Examiner—Hong C. Kim

[57] ABSTRACT

A memory controller receives reads, memory writes, and cache writes. A pending read is selected and issued to memory. When a response is received from memory, all cache writes are checked to determine whether any correspond to the pending read. If there is a corresponding cache write, the data from the corresponding cache write is used to respond to the pending read. Otherwise, prior memory writes are checked to determine whether any correspond to the pending read. If there is a corresponding prior memory write, the data from the corresponding prior memory write is used to respond to the pending read. A coherency check from associated caches may also be performed, and the appropriate data returned to the processor that requested the read. Three queues may control the order in which memory access is performed. A read queue that contains read requests is typically given highest priority, and therefore reads are generally serviced first. A wait queue contains read requests and memory write requests, and is incremented to the pending read before the pending read is completed. As the wait queue is incremented, memory writes from the wait queue are entered onto a ready queue. Each request retrieved from the wait queue is checked against pending requests in the ready queue. Cache writes are entered directly onto the ready queue. When either a conflict is detected for the pending ready, or when the ready queue contains a certain amount of requests, the ready queue is flushed.

19 Claims, 4 Drawing Sheets

MEMORY CONTROLLER WITH PRIORITY QUEUES

BACKGROUND OF THE INVENTION

1. Field of the Invention

This invention relates generally to computer systems, and more particularly to memory control within a system that includes cache memory.

2. Discussion of the Related Art

It has become increasingly desirable to increase the speed with which computers process information. Two schemes for increasing processing speed include improving memory access time and using multiple processors.

A common manner in which to improve memory access time is to provide a cache memory along with a main memory. A cache memory is typically associated with a processor, and requires less access time than the main memory. A cache memory that is associated with a particular processor may also be referred to as a local cache. Copies of data from reads and writes from the processor are retained in the cache. Some cache systems retain recent reads and writes, while others may have more complex algorithms to determine which data is retained in the cache memory. When a processor requests a data read for data which is currently in the cache, only the cache memory is accessed. Since the cache memory requires less access time than the main memory, processing speed is improved.

Additionally, a cache system may be used to increase the effective speed of a data write. For example, if a processor is to write to a data location, the processor may perform a data write only to the cache memory. The cache memory and associated control logic may then write the data to the main memory while the processor proceeds with other tasks.

The use of multiple processors may also improve the effective speed by which a computer operates. In a multiple processor arrangement, several processors may simultaneously perform related functions in order to decrease the overall time required to perform those functions. In many cases, it is advantageous for the several processors to share a common bus and a common main memory, so that data to be transferred among the several processors may be quickly communicated.

However, if a cache system is to be combined with a multiple processor arrangement, there is a possibility that one of the caches associated with one of the processors may contain data required by another of the processors. In such an instance, the processor that requires the data may receive "stale" or old data from the memory. Furthermore, if a memory is responding to several read and write requests from multiple processors that have cache memories, there is a possibility that data corresponding to a particular read request has already been updated in one of the caches. It is also possible that the data corresponding to a particular read request has a pending write request that has not yet been actually written. This situation may also result in stale data being returned to the processor in response to a read request.

SUMMARY OF THE INVENTION

In an illustrative embodiment of the invention, a memory controller receives reads, memory writes, and cache writes. A pending read is selected and issued to memory. When a response is received from memory, all cache writes are checked to determine whether any correspond to the pending read. If there is a corresponding cache write, the data from the corresponding cache write is used to respond to the pending read. If there is not a corresponding cache write, then prior memory writes are checked to determine whether any correspond to the pending read. If there is a corresponding prior memory write, the data from the corresponding prior memory write is used to respond to the pending read. A coherency check from associated caches may also be performed, and the appropriate data returned to the processor that requested the read.

In another illustrative embodiment of the invention, a memory controller includes three queues to control the order in which memory access is performed. A read queue that contains read requests is typically given highest priority, and therefore reads are generally serviced first. A wait queue contains read requests and memory write requests, and is incremented to the pending read before the pending read is completed. As the wait queue is incremented, memory writes from the wait queue are entered onto a ready queue. Each request retrieved from the wait queue is checked against pending requests in the ready queue. Cache writes are entered directly onto the ready queue. When either a conflict is detected for the pending ready, or when the ready queue contains a certain amount of requests, the ready queue is flushed. Flushing the ready queue includes retrieving the next request from the ready queue, checking the next request against requests in the wait queue for conflicts, and performing the request.

BRIEF DESCRIPTION OF THE DRAWINGS

Other features and advantages of the present invention shall appear from the following description of an exemplary embodiment, said description being made with reference to the appended drawings, of which.

DETAILED DESCRIPTION

Figure 1:
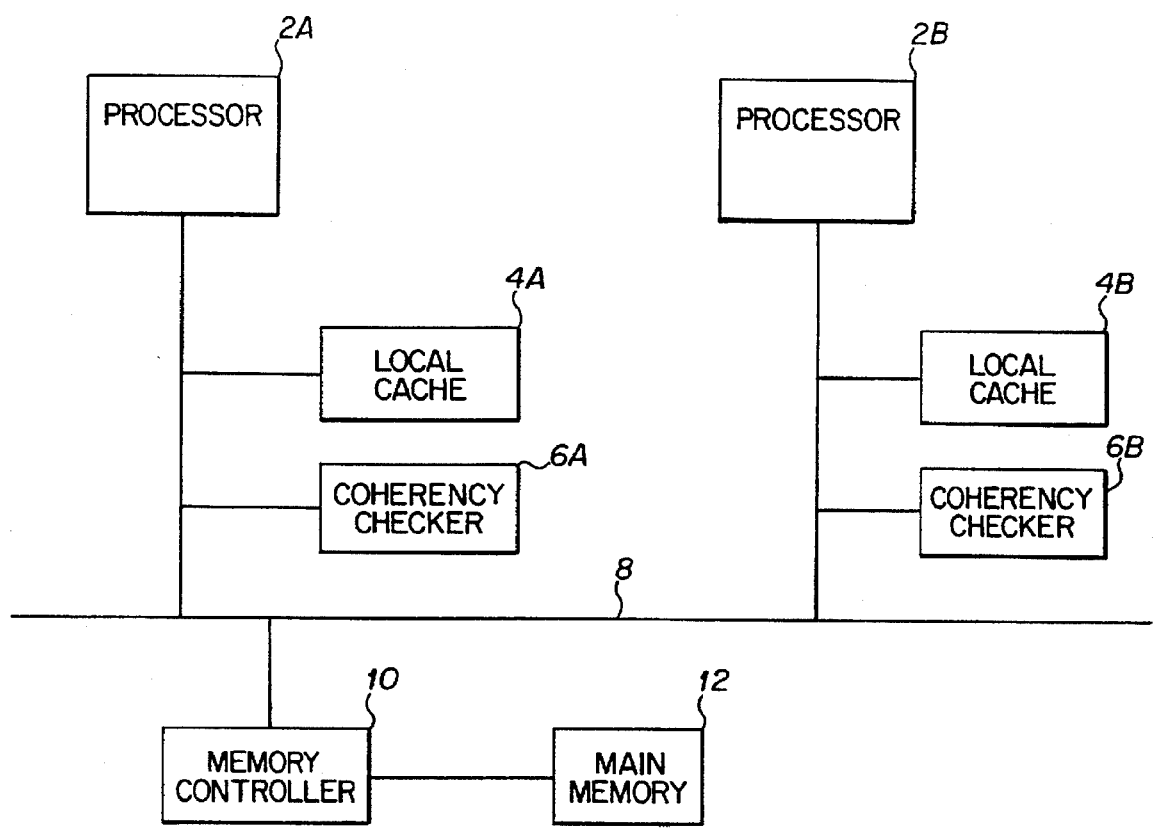
FIG. 1 is a block diagram of a multiple processor arrangement.

FIG. 1 illustrates a multiple processor arrangement, in which processor 2A and processor 2B are both connected to processing bus 8. Processor 2A is also connected to local cache 4A and coherency checker 6A, and Processor 4B is also connected to local cache 4B and coherency checker 6B. Local caches 4A, 4B may be connected to directly to the processing bus 8, or to private buses, connected to processors 2A, 2B, respectively. Additionally, the coherency checkers 6A, 6B, also called snoopers, may be part of either the processors 2A, 2B or the local caches 4A, 4B. Main memory 12 is connected to the processing bus 8 by a memory controller 10.

When processor 2A requests a data read, the data is provided by local cache 4A if local cache 4A contains the desired data. The term "data", as used in this application, refers to instructions, such as program memory, as well as other types of data. If local cache 4A does not contain the desired data, processor 2A will request a data read from memory controller 10 across processor bus 8. Memory controller 10 accesses the desired data from main memory 12, and provides the desired data to processor 2A. Coherency checker 6B for the other processor 2B monitors processing bus 8 to determine whether data requested from main memory 12 by processor 2A is also contained in local cache 4B. For example, processor 2B may have updated local cache 4B for a particular memory location, but local cache 4B has not yet written the updated data to main memory 12. In such an instance, when processor 2A requests a data read from main memory 12 for that particular data, main memory 12 would return an old version of that data, which is also referred to as "stale data".

In order to avoid stale data being returned to processor 2A, coherency checker 6B informs memory controller 10 that a data read has been requested for stale data. Accordingly, instead of memory controller 10 returning the stale data, local cache 4B may respond to the data read from processor 2A with the proper data.

Processors 2A, 2B may have several data reads and data writes at any given time for memory controller 10 and main memory 12 to process. Memory controller 10 will generally prioritize all access requests based on the order in which the access requests were received. Typically, however, the processors 2A, 2B must wait for a response to a data read before proceeding, whereas the processors 2A, 2B can proceed directly to a subsequent task following a data write request. Accordingly, memory controller 10 places data reads at a higher priority than data writes. In this manner, overall processing speed may be improved.

At least two types of data writes may be received by memory controller 10. A first type of data write, called a memory write, may occur in at least three instances. The first instance of a memory write, also called a write-through, is a write directly from a processor 2A, 2B, in which a copy of the data has not been retained in the local cache 4A, 4B. The second instance, also called an uncachable write, is an update for the memory location from processor 2A, 2B or local cache 4A, 4B in which the local cache 4A, 4B will retain the data and will continue to monitor processing bus 8 for cache coherency for that data location. An example of the third instance is an Input/Output (I/O) write, in which a device such as an I/O device (a communications interface, for example) that writes data directly to memory 12.

A second type of data write received by memory controller 10 is called a cache write. A cache write is a data write from a cache 4A, 4B of data for which cache 4A, 4B previously stored the data, but will no longer store it. The operation in which cache 4A, 4B writes data to main memory, and does not retain a copy, is also called expelling. If processor 2B no longer desires to retain a particular data location in local cache 4B, processor 2B or local cache 4B can expel this data location. Expelling may be performed because processor 2B knows that it no longer requires that data. Alternatively, processor 2B or local cache 4B may have determined that expelling will free up space in local cache 4B for other data, for example data which is accessed more frequently by processor 2B.

It is important that memory controller 10 be aware that a cache write is requested by processor 2B. Following the cache write, coherency checker 6B will no longer monitor the processing bus 8 for access to that data location, since the data corresponding to that data location has been expelled from the cache 4B. Since the data of a cache write will no longer be checked, it is preferred that memory controller 10 be aware of data which has been expelled, in order to avoid returning stale data in response to a data read of previously expelled data. Accordingly, the memory controller 10 may prioritize cache writes higher than normal memory writes. Furthermore, the data read may have issued subsequent to a cache write, but due to bus contention on processor bus 8, the cache write may be received by memory controller 10 subsequent to the data read. In such an instance, the memory controller may prioritize such a cache write higher than a preceding read.

Figure 2:
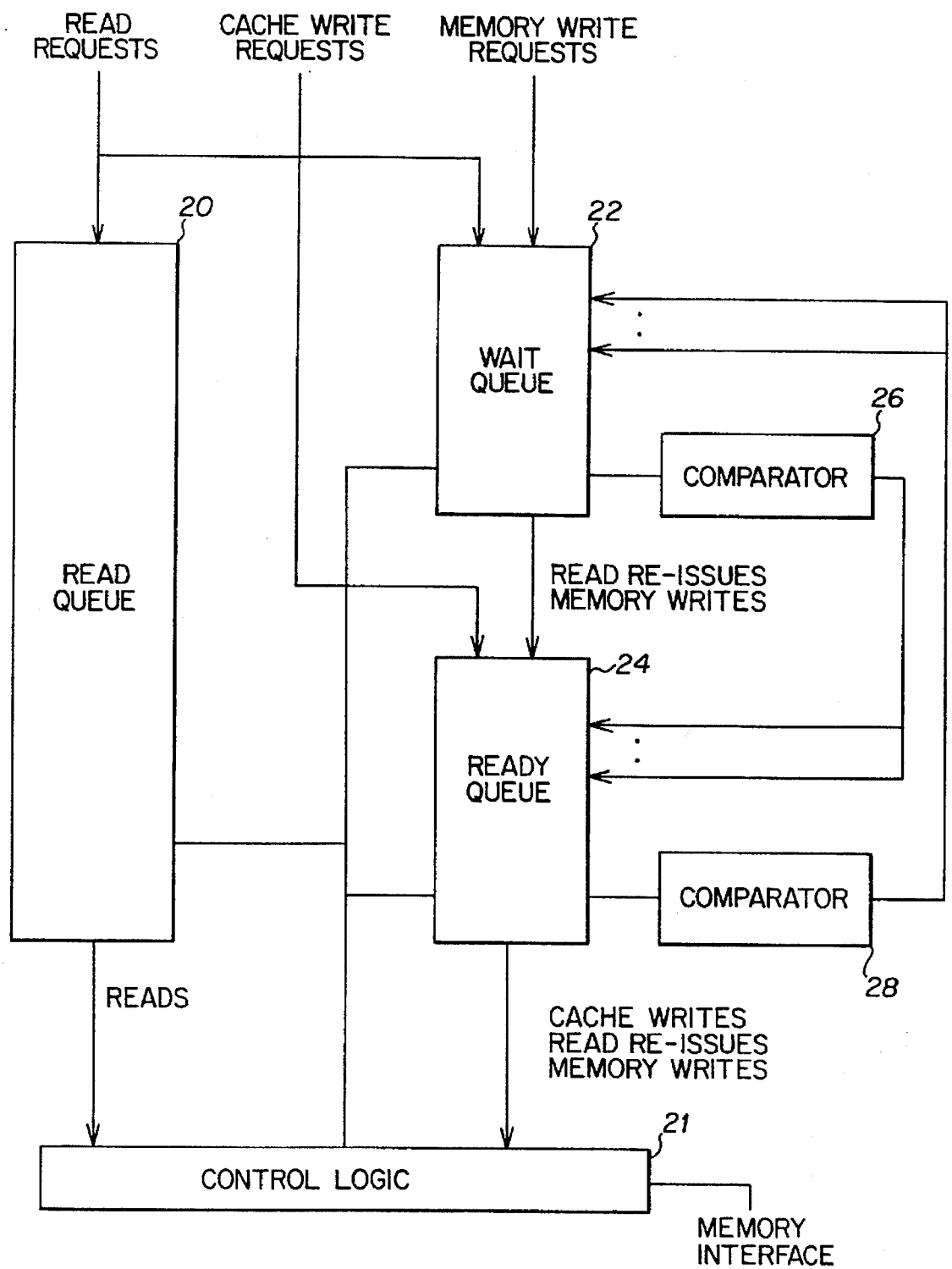
FIG. 2 is a block diagram of an embodiment of the invention.

A block diagram of an embodiment of a memory controller according to the present invention is shown in FIG. 2. FIG. 2 shows three queues which may be used to order the memory access requests, in order to ensure fast operation without adversely affecting data validity. The three queues may be implemented in software, or in hardware by devices such as first in first out (FIFO) buffers or other equivalents. Memory access requests received by memory controller 10 include read requests, memory write requests, and cache write requests. The queues shown may hold the addresses for the requests, as well as an indication of the type of request. If the request is a cache write or a memory write, the data associated with the request may either be held within the queue or in temporary memory. Other schemes other than addresses may be used to identify each memory access request, such as object identifiers. Furthermore, the address itself may be a virtual or a logical address.

Read requests are entered onto both the read queue 20 and the wait queue 22. Memory write requests are entered onto the wait queue 22. Cache write requests are entered onto ready queue 24. Memory controller 10 services reads from the read queue 20 first. Since there may be a delay in response from main memory 12, memory controller may issue several requests before receiving a data response back from main memory 12. When a data response is received, memory controller 10 retrieves requests off of the wait queue 22 until the retrieved request matches the read for which the data response has been received. Memory write requests retrieved from the wait queue 22 are entered onto the ready queue 24.

When a retrieved request from the wait queue 22 matches data response from a pending read, the wait queue 22 contains reads and memory writes that are subsequent to the pending memory read. The ready queue 24 contains uncompleted memory writes that were prior to the pending read. These memory writes should be checked to ensure that none of them matches the address of the pending read, which would render the data from the pending read stale. Additionally, the ready queue 24 contains memory cache writes that have not yet been actually written into main memory 10, but for which coherency checker 6A, 6B may not be checking anymore, since data has been expelled.

Accordingly, each retrieved request from wait queue is compared, preferably via a comparator 26, to each pending request in the ready queue 24. If there is a match, then a conflict exists which must be resolved prior to returning the read data. If there is not a match, then no conflict exists and the pending read proceeds.

Memory controller 10 proceeds with the pending read by determining whether any coherency responses have been received from coherency checkers 6A, 6B. If there has been a coherency response indicative of a local cache having valid data, then the data retrieved from main memory 12 is not used. Instead, the valid data from local cache 4A, 4B corresponding to coherency checker 6A, 6B that responded is used.

In one method of resolving a conflict, the pending read is entered onto the ready queue 24 as a read re-issue, and the ready queue 24 is flushed. Flushing ready queue 24 involves retrieving and processing each request from ready queue 24. Each request in the ready queue 24 is also compared to the requests in the wait queue 22, and if a match is found the corresponding request in the wait queue is labeled. This is necessary due to a possible to a delay between a read request and return of data. Because of this possible delay, there may be read requests in the wait queue 22 that were requested prior to a write being retrieved from of the ready queue 24. Accordingly, the matching requests are labeled, so that it is known when they are processed that a conflict existed. Requests that are retrieved from ready queue include cache writes, memory writes, and read re-issues. Once the read re-issue that corresponds to the pending read that initiated the flush is reached in the ready queue 24, the flush is complete. The read re-issue, which corresponds to the pending read discussed above, may then be performed from main memory 12, and coherency check completed as described above.

In one embodiment, when comparators 26, 28 have located an address match (a conflict) in either the wait queue 22 or the ready queue 24, the request contained in the address match may be labeled by activating a bit associated with the requests. In this manner, the conflicting addresses may be identified.

In an alternative method for resolving a conflict, the data from the conflicting request is used in response to the read request, without flushing the ready queue 24. For example, if a memory write were located that was received prior to the pending read request, then the data from the located memory write may be used for the response to the read request.

If there are no conflicts, reads may be performed from read queue 20 while memory write requests and cache write requests continue to build up in ready queue 24. Accordingly, memory controller 10 may check contents of ready queue 24 to determine if at least some of the contents of ready queue 24 should be processed even though there have been no conflicts. For example, if the ready queue 24 is a fixed percentage full, ready queue 24 may be completely or partially flushed. Also, if temporary memory associated with the requests on the ready queue is near capacity, then ready queue 24 may be completely or partially flushed. In these instances, it is possible to flush only a fixed number of requests that are in the ready queue 24, or only flush until a certain minimum amount of the ready queue 24 or temporary memory capacity is filled.

In a preferred embodiment, the queues 20, 22, 24 as well as control logic 21 to perform the described functions are implemented as hardware within a single memory controller chip. The queues 20, 22, 24 may also be smart queues which perform the functions described above. Alternatively, as shown in FIG. 2, control logic 21 may perform these coordinating functions. Additionally, control logic 21 performs other conventional memory controller functions, such as interface to processor bus 8 and interface with memory 12. Alternatively, however, the memory controller may include a processor and memory, and implement queues 20, 22, 24 in software, for example as labeled registers. Moreover, a combination of hardware and software may be used to implement an embodiment of the invention.

Figure 3:
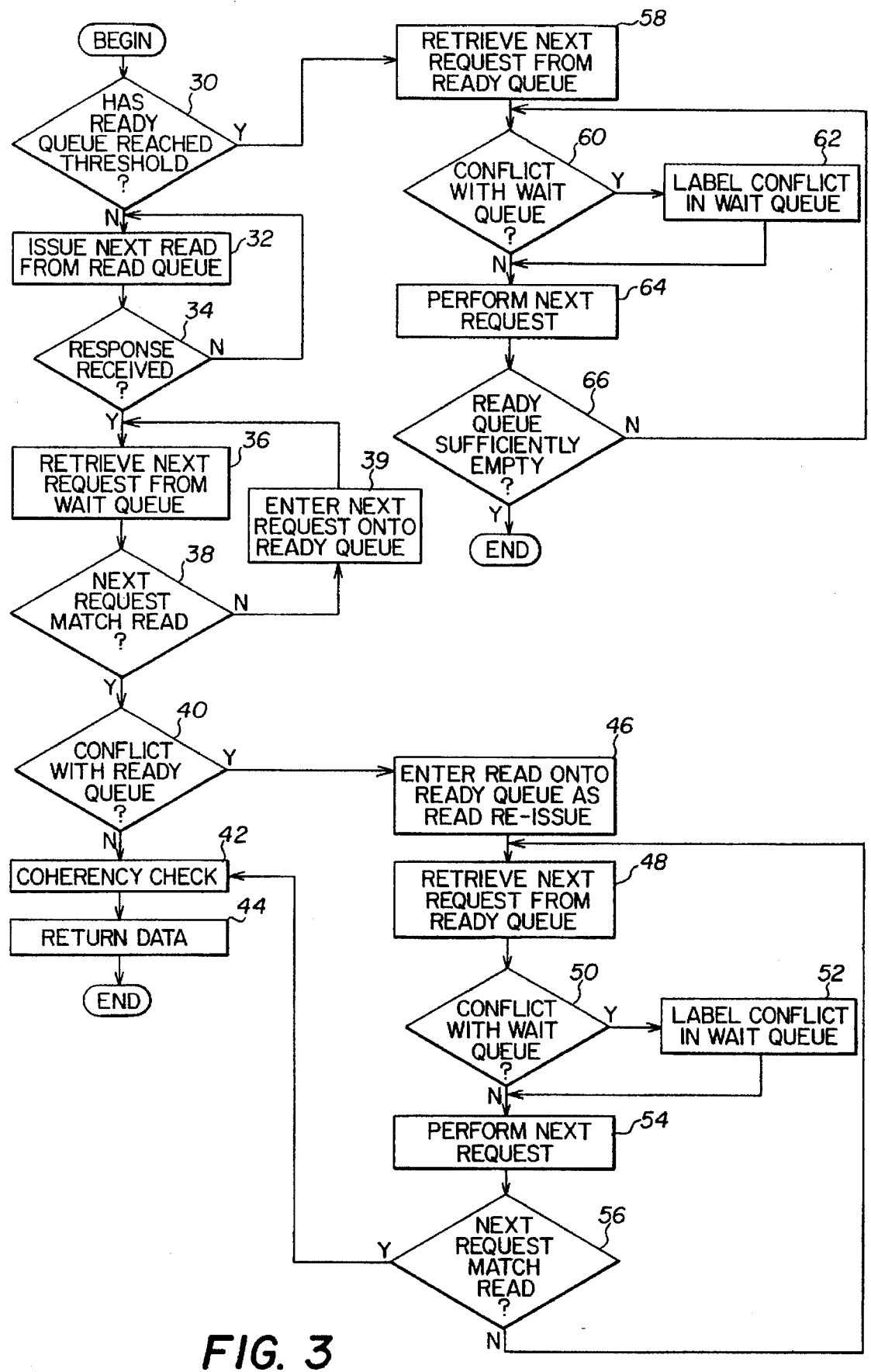
FIG. 3 is a flowchart showing steps of a process in accordance with an embodiment of the invention.

FIG. 3 is a flowchart that describes a processing flow in accordance with an embodiment of the invention, typically performed by the memory controller 10. In step 30, it is determined whether the ready queue 24 has reached a threshold. If not, then the next read is issued from the read queue 20 in step 32. The step of issuing a read may include directly accessing main memory 12, or issuing a read request which may not be returned immediately. In step 34, if no response has been received, then the process returns to step 32 to issue an additional read. When a response has been received, the next request from the wait queue 24 is retrieved in step 36. In step 38, the retrieved request is checked to see if it matches the pending read. If not, then in step 39 the retrieved request is entered onto the ready queue 24, and the process returns to step 36 to retrieve the next request from the wait queue 22. If the retrieved request matches the pending read, then in step 40, the possibility of conflict with pending requests in the ready queue is checked. If there are no conflicts, then a coherency check is performed in step 42. Preferably, the coherency check is performed by the coherency checkers 6A, 6B associated with the various processors. Data is then returned to the processor 2A which requested the read in step 44. If the coherency check indicated that no other local cache 4B contained valid data, then the data retrieved from main memory may be returned to processor 2A. However, if the coherency check revealed that main memory contained stale data, then data from the appropriate local cache may be used.

If a conflict with ready queue 24 was determined in step 40, then the pending read is entered onto ready queue 24 as a read re-issue in step 46. Then, the ready queue 24 is flushed in steps 48–56. In particular, step 48 retrieves the next request from the ready queue 24. The requests in the ready queue may be memory writes, cache writes, or the read re-issue. As each request is retrieved, in step 50 the retrieved request is compared to pending requests in the wait queue 22 to determine if there is a conflict. If there is a conflict, in step 52 the conflicting request in the wait queue 22 is labeled. Whether or not there is a conflict, in step 54 the retrieved request is performed, for example by performing a cache write or a memory write to main memory 12, or by performing the read re-issue. In step 56, the retrieved request is checked to determine if it matches the pending read. If the read re-issue matches the pending read, then the coherency check is performed in step 42, and the data is returned to the requesting processor as described above. If the retrieved request does not match the pending read, then control is returned to step 48.

If it is determined that the ready queue 24 has reached a threshold in step 30, then a flushing is performed in steps 58–66. In step 58, the next request is retrieved from the ready queue 24. In step 60, it is determined whether a conflict exists with the wait queue 22. If so, the conflict is labeled in step 62. The next request is performed in step 64, and in step 66 the ready queue 24 is checked to determine whether the flushing should continue. The flushing operation may continue until step 66 determines that the ready queue 24 is empty, until the ready queue 24 reaches a certain threshold, or the flushing operation may simply be performed a predetermined number of times.

The point at which the ready queue is flushed, as well as the amount which it is flushed, may also be determined by a user, or may be programmed by software.

Figure 4:
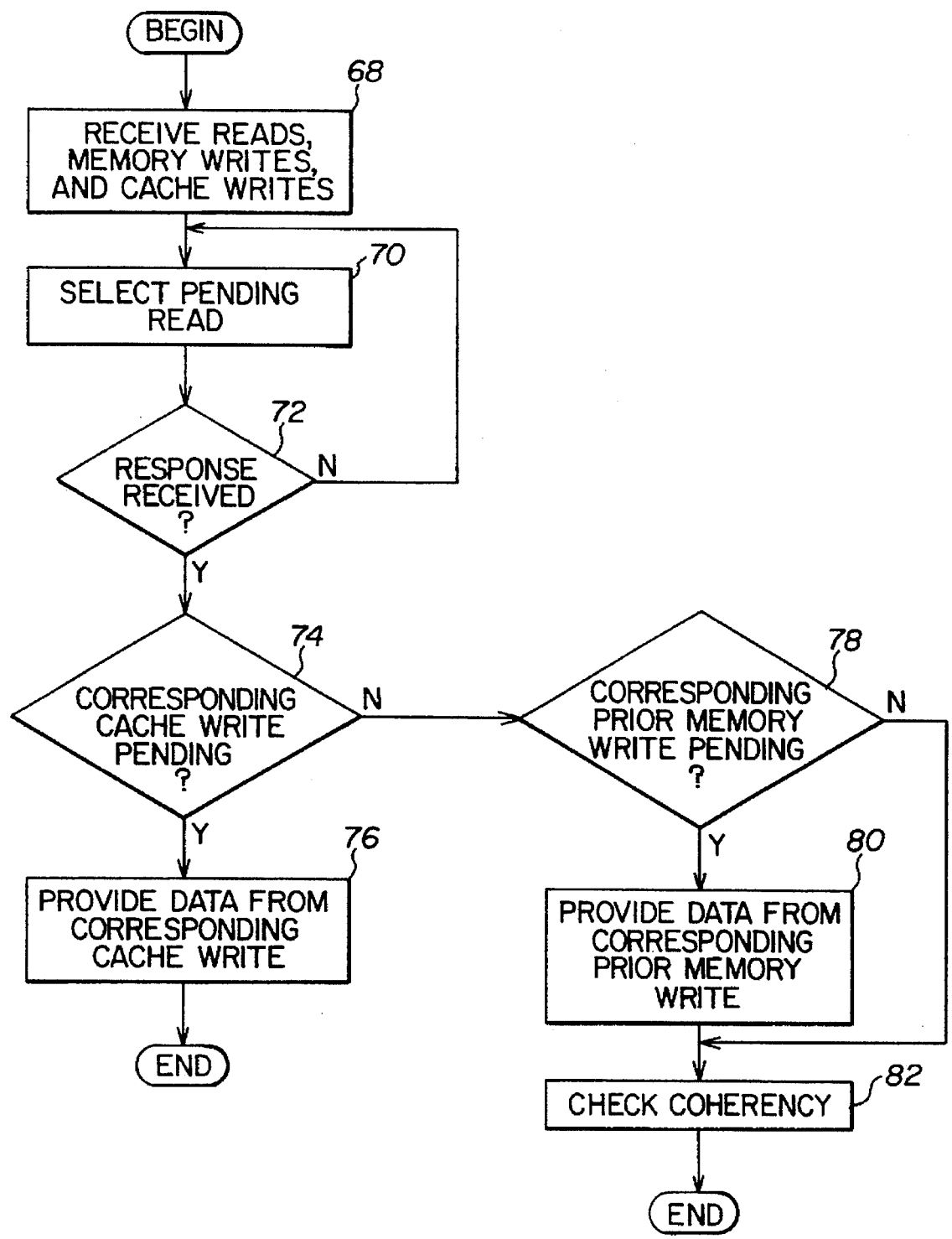
FIG. 4 is a flowchart showing steps of a process in accordance with another embodiment of the invention.

FIG. 4 depicts another process in accordance with an embodiment of the invention, typically performed by the memory controller 10. In step 68, reads, memory writes, and cache writes are received. In step 70 a pending read is selected. Preferably, the selected pending read may be the earliest read received, but there are other priority schemes which may be implemented. For example, each different processor 2A, 2B may have a different priority associated with it, so that, for example, reads from processor 2A are prioritized higher than reads from processor 2B. Alternatively, individual priorities may be assigned to each request by each processor 2A, 2B, or certain tasks performed by the processors 2A, 2B may have assigned priorities. In any event, another read may be selected in step 70, if no response has been received yet in step 72. When a response is received, pending cache writes are analyzed to determine whether any pending cache writes correspond to the pending read. These pending cache writes include any cache writes that have been received but not yet completed. If there is a pending corresponding cache write, then the data from the pending corresponding cache write is used in step 76 for the response to the pending read.

If there is no corresponding cache write pending, then in step 78 prior memory writes are analyzed to determine whether any prior memory writes correspond to the pending read. Prior memory writes are typically memory writes that were received prior to reception of the pending read. If there is a prior memory write, then the data from the most recent prior memory write may be substituted for the data from the pending read in step 80. Whether the answer to step 78 is affirmative or negative, a coherency check is performed in step 82. Typically, as described above, the coherency check will involve receiving confirmation from processors 2A, 2B or coherency checkers 6A, 6B (snoopers) to determine whether the data currently assigned to the read is stale. If the data is stale, then the valid data may be substituted for the stale data.

Alternatively, the process shown in FIG. 4 can proceed directly from step 76 to step 78. In this manner, even though the data from the corresponding cache write has been provided, the data from a corresponding memory write that is subsequent to the cache write may be used. The implementation of different alternatives depend upon the type of processing system. For example, a control system may require highly correlated time data, while static data processing systems may not be so time-dependent.

Having thus described several particular embodiments of the invention, various alterations, modifications, and improvements will readily occur to those skilled in the art. For example, the arrangement described included a processing bus. However, any network system that includes memory or other processing requests may benefit from this invention, for example a network database system. Furthermore, the memory controller may be contained within a main memory or may be coupled to numerous main memories. Such alterations, modifications, and improvements are intended to be within the spirit and scope of the invention. Accordingly, the foregoing description is by way of example only, and not intended to be limiting. The invention is limited only as defined in the following claims and the equivalents thereto.

What is claimed is:

1. A memory controller for controlling access to a main memory from at least one processor having a local cache, the memory controller comprising:

a read queue, having an input that receives read requests from the at least one processor and an output that provides the read requests in an order in which the read requests are received by the read queue;

a wait queue, having an input that receives memory write requests and the read requests from the at least one processor and an output that provides the memory write requests and the read requests in an order in which the memory write requests and the read requests are received by the wait queue;

a ready queue, having an input that receives ready requests including cache write requests from the at least one processor and memory write requests and read requests from the output of the wait queue, the ready queue having an output that provides the ready requests in an order in which the ready requests were received by the ready queue; and a control circuit, coupled to the read queue, the wait queue, and the ready queue, including circuitry that: processes read requests from the read queue;

transfers ready requests from the wait queue to the ready queue until a read request corresponding to a currently processed read request is reached;

identifies conflicts of the currently processed read request with requests in the ready queue to determine valid data; and returns the valid data to the at least one processor in response to read requests.

2. The memory controller of claim 1, wherein the control circuit processes each ready request in the ready queue when a conflict is identified.

3. The memory controller of claim 1, wherein the ready queue includes an indicator circuit having an output activated when an amount of requests stored in the ready queue exceeds a predetermined level, and wherein the control circuit processes at least part of the ready requests in the ready queue when the indicator output of the indicator circuit is activated.

4. The memory controller of claim 1, wherein the memory controller is coupled to a plurality of processors, a plurality of local caches corresponding to the plurality of processors, and a plurality of cache checkers corresponding to the plurality of local caches, each of the plurality of cache checkers providing an indication of whether the currently processed read request contains stale data, and wherein the control circuit receives the indications from the cache checkers and cancels the currently processed read request when the indication is that the currently processed read request contains stale data.

5. The memory controller of claim 1, wherein the memory write requests and cache write requests are stored in the wait queue and the ready queue as address locations, the memory controller further comprising temporary memory that contains data corresponding to the memory write requests and the cache write requests.

6. The memory controller of claim 1, further including:

a wait queue comparator, coupled to the wait queue and the ready queue, that provides an indication of read requests and memory write requests in the wait queue corresponding to a request at the output of the ready queue; and a ready queue comparator, coupled to the wait queue and the ready queue, that provides an indication of whether any request in the ready queue corresponds to a request that is at the output of the wait queue.

7. A method for controlling memory access to a main memory from a plurality of processors, the method comprising the steps of:

receiving reads, memory writes, and cache writes from the plurality of processors;

placing the reads onto a read queue;

placing the reads and the memory writes onto a wait queue; and placing the cache writes onto a ready queue that has an input coupled to an output of the wait queue;

requesting a response from the main memory for data corresponding to a pending read selected from the received reads, the pending read having been received from a first processor of the plurality of processors;

determining whether a cache write corresponding to the pending read has been received by comparing the pending read with items in the ready queue, the cache write being indicative of a second processor of the plurality of processors expelling cache data from a local cache that is associated with the second processor;

providing data expelled from the local cache to the first processor when a cache write corresponding to the pending read has been received; and providing the data from the main memory to the first processor when a cache write corresponding to the pending read has not been received.

8. The method of claim 7, further including steps of determining whether a memory write that corresponds to the pending read has been received prior to reception of the pending read, the memory write being indicative of a third processor of the plurality of processors writing data retained in a local cache associated with the third processor to the main memory; and providing data from the memory write that corresponds to the pending read to the first processor when a prior memory write that corresponds to the pending read has been received.

9. The method of claim 8, further including the steps of:

writing data to the main memory in accordance with memory writes that were received prior to the pending read;

writing data to the main memory in accordance with cache writes that have been received, and requesting from the main memory data corresponding to the pending read.

10. The method of claim 9, further including the steps of:

determining whether at least one of a received read and a memory write corresponds to each cache write and memory write for which data is written to main memory; and labeling each of the received read and memory write that is determined to correspond to each cache write and memory write.

11. The method of claim 9, wherein the steps of writing data to the main memory in accordance with memory writes and cache writes includes the step of retrieving each cache write and memory write from the ready queue.

12. The method of claim 7, wherein the plurality of processors includes a plurality of local caches corresponding to the plurality of processors, and a plurality of cache checkers corresponding to the plurality of local caches, the method further comprising the steps of:

determining whether any of the plurality of local caches contain recent data corresponding to the pending read; and providing data from a local cache as the valid data when the local cache contains recent data corresponding to the pending read.

13. The method of claim 7, further including the steps of:

determining whether a predetermined number of memory writes received prior to the pending read and cache writes have been received:

performing a number of the memory writes received prior to the pending read and the cache writes when a predetermined number have been received.

14. An apparatus for controlling memory access to a main memory from a plurality of processors, the apparatus comprising:

means for receiving reads, memory writes, and cache writes from the plurality of processors;

means for placing the reads onto a read queue;

means for placing the reads and the memory writes onto a wait queue; and means for placing the cache writes onto a ready queue that has an input coupled to an output of the wait queue;

means for requesting a response from the main memory data corresponding to a pending read selected from the received reads, the pending read having been received from a first processor of the plurality of processors;

means for determining whether a cache write corresponding to the pending read bas been received by comparing the pending read with items in the ready queue, the cache write being indicative of a second processor of the plurality of processors expelling cache data from a local cache that is associated with the second processor;

means for providing data from the cache write to the first processor when a cache write corresponding to the pending read has been received; and means for providing the data from the main memory to the first processor when a cache write corresponding to the pending read has not been received.

15. The apparatus of claim 14, further including:

means for determining whether a memory write that corresponds to the pending read has been received prior to reception of the pending read, the memory write being indicative of a third processor of the plurality of processors writing data retained in a local cache associated with the third processor to the main memory; and means for providing data from the prior memory write that corresponds to the pending read to the first processor when a prior memory write that corresponds to the pending read has been received.

16. The apparatus of claim 15, further including:

means for writing data to the main memory in accordance with memory writes that were received prior to the pending read;

means for writing data to the main memory in accordance with cache writes that have been received, and means for requesting from the main memory data corresponding to the pending read.

17. The apparatus of claim 16, further including:

means for determining whether at least one of a received read and a memory write corresponds to each cache write and memory write for which data is written to main memory; and means for labeling each of the received read and memory write that is determined to correspond to each cache write and memory write.

18. The apparatus of claim 14, wherein the plurality of processors includes a plurality of local caches corresponding to the plurality of processors, and a plurality of cache checkers corresponding to the plurality of local caches, and wherein the means for determining whether the response contains stale data further includes:

means for determining whether any of the plurality of local caches contain recent data corresponding to the pending read; and means for providing data from a local cache as the valid data when a local cache contains recent data corresponding to the pending read.

19. The apparatus of claim 14, further including:

means for determining whether a predetermined number of memory writes received prior to the pending read and cache writes have been received:

means for performing a sufficient number of the memory writes received prior to the pending read and the cache writes when a predetermined number have been received.

* * * * *